(12) United States Patent  
Boele (10) Patent No.: US 8,511,475 B2  
(45) Date of Patent: Aug. 20, 2013

(54) SEPARATING DEVICE AND METHOD (75) Inventor: Hendrik Arie Boele, Rijkevorsel (BE)

(73) Assignee: Evodos B.V., Loosdrecht (NL)

( * ) Notice: Subject to any disclaimer, the term of this patent is extended or adjusted under 35 U.S.C. 154(b) by 402 days.

(21) Appl. No.: 12/667,324

(22) PCT Filed: Jul. 3, 2008

(86) PCT No.: PCT/NL2008/050450
§ 371 (c)(1),
(2), (4) Date: Nov. 9, 2010

(87) PCT Pub. No.: WO2009/005355
PCT Pub. Date: Jan. 8, 2009

(65) Prior Publication Data
US 2012/0067788 A1    Mar. 22, 2012

(30) Foreign Application Priority Data

Jul. 3, 2007    (EP) .................................... 07111657

(51) Int. Cl.
*B07B 7/08*    (2006.01)
(52) U.S. Cl.
USPC ........... 209/142; 209/139.2; 209/148; 494/55
(58) Field of Classification Search
USPC ................. 209/139.1, 139.2, 142, 148, 713, 209/714; 494/50, 55, 56, 65
See application file for complete search history.

(56) References Cited

U.S. PATENT DOCUMENTS

| 717,803 | A | * | 1/1903 | Berrigan ........................ 494/44 |
| 1,061,656 | A | * | 5/1913 | Black ............................. 494/74 |
| 3,279,611 | A | | 10/1966 | Von Rotel |
| 3,862,714 | A | * | 1/1975 | Boadway ........................ 494/37 |
| 4,409,097 | A | * | 10/1983 | Barthelmess ................... 209/11 |
| 4,971,518 | A | * | 11/1990 | Florin ........................ 415/121.2 |
| 5,762,800 | A | * | 6/1998 | Meikrantz et al. .......... 210/512.3 |
| 6,616,840 | B1 | * | 9/2003 | Boele ............................. 210/297 |
| 6,827,221 | B1 | * | 12/2004 | Brundiek et al. ............. 209/210 |
| 2002/0119883 | A1 | * | 8/2002 | Herman et al. ................. 494/75 |
| 2009/0266231 | A1 | * | 10/2009 | Franzen et al. .................. 95/68 |

FOREIGN PATENT DOCUMENTS

| GB | 1031522 | 6/1966 |
| GB | 1476670 | 6/1977 |
| JP | 38-21896 Y | 10/1963 |
| JP | 41-22311 B | 12/1966 |

(Continued)

OTHER PUBLICATIONS

Database WPI Week 198832 ThomsonScientifc London GB AN 1988-227072; XP002459923 & SU 1369810 (VTORNEFTEPRODUCT OI) Jan. 30, 1988, Abstract only.

*Primary Examiner* — Joseph C Rodriguez
(74) *Attorney, Agent, or Firm* — Novak Druce Connolly Bove + Quigg LLP (57) ABSTRACT

A plate type rotational centrifugal separator for separating one or more components of a feed stream includes a rotatable first outer carrier and a rotatable second inner carrier coaxially arranged in the first outer carrier. The first outer carrier supports one or more curved plates which are flexibly connected to the second inner carrier. A feeding arrangement disposed at one end of the separator supplies a feed stream to be separated, and a discharging arrangement disposed at the opposite end of the separator discharges separated streams. Confined spaces are defined between adjacent curved plates and the first outer and second inner carrier for separating the feed stream under influence of centrifugal forces. The first outer carrier is axially removable from the second inner carrier for removing components collected on the plates.

18 Claims, 8 Drawing Sheets

(56) References Cited

FOREIGN PATENT DOCUMENTS

| | | |
|---|---|---|
| JP | 4-267873 B | 9/1992 |
| JP | 6-90737 A | 4/1994 |
| JP | 9-192538 A | 7/1997 |
| JP | 10-209815 A | 8/1998 |
| JP | 2000-140707 A | 5/2000 |
| JP | 2002-531236 A | 9/2002 |
| JP | 2003-47887 A | 2/2003 |
| WO | 99/54021 | 10/1999 |

* cited by examiner

SEPARATING DEVICE AND METHOD

CROSS-REFERENCE TO RELATED APPLICATIONS

This application is a US national stage application of PCT International Application No. PCT/NL2008/050450, filed Jul. 3, 2008, which designated the United States and has been published as International Publication No. WO 2009/005355 and on which priority is claimed under 35 U.S.C. §120, and which claims the priority of European Patent Application, Application No. EP 07111657.8, filed Jul. 3, 2007, pursuant to 35 U.S.C. 119(a) (d), the contents of which are incorporated herein by reference in their entirety as if fully set forth herein.

BACKGROUND OF THE INVENTION

The invention is directed to a plate type rotational separator and a method for separating one or more components from a fluid (gas, liquid or combinations thereof) stream.

Devices for separating components from a fluid (gas, liquid or combinations thereof) are known in the art. One sort of separating devices separates different fluids and/or solids from fluids or droplets or particles from gases by a difference in specific gravity. For instance in settlers, this kind of separation technique is applied by using gravity as the driving force. For certain applications, where small particles or droplets are dispersed in a fluid or gas, gravity is not sufficient to separate the different phases. To enhance separation, the centrifugal force is used. For instance in the milk industry, to separate fat particles from whole milk, centrifuges are found to be suitable separators. Due to their high rotational speeds, these devices can reach centrifugal accelerations that are several orders of magnitudes higher than the gravitational acceleration. This results in that the separation velocity is very high and the separation very efficient. In order to further increase the efficiency of these centrifuges, they are often provided with internals. These internals increase the efficiency by preventing turbulence and increasing the effective surface area. The most frequently used internals are plates in different shapes and sizes.

Robert Plat describes in his PhD thesis "Gravitational and centrifugal oil-water separators with plate pack internals", Delft University of Technology, 1994 (ISBN:90-6275-985-8), among other separation techniques, plate packed centrifuges containing different geometrical arrangements of packs of plates. A specific geometry that is described by Plat in more detail is a set of plates arranged parallel to the axis of rotation. The plates in these centrifuges are positioned at an angle relative to the radius.

An advantage of this device is that the flow direction of the contaminated fluid feed is parallel, or substantially parallel, to the rotation shaft. As a result, there is no or negligible counter flow of contaminated fluid. Such counter flow is for instance one of the disadvantages of a stacked disk centrifuge system such as described in Appendix D of the PhD thesis of Plat. The absence of a counter flow of contaminated fluid makes the device less dependent on the feed flow, on the different densities of the components, and on the different viscosities of the components.

With radial plates the plate distance increases towards the outer radius. Droplets entering the pack near the outer radius have to travel a longer distance to reach the surface of a plate than droplets entering the pack near the inner radius. Since the continuous-phase flow velocity increases with plate distance, the liquid which enters the plate pack near the outer radius will have a relatively low residence time. Together with the longer settling distance, this will negatively affect the separation efficiency near the outer radius. Plat therefore suggests using curved plates instead of flat plates, thereby making the plates more or less equidistant.

A major disadvantage of the device described by Plat is that it is very difficult to clean, in particular to remove any deposited solids from the plate pack. Cleaning the plate packs is difficult because of the relatively small distance between the plates and the curved shape of the plates. The curved shape makes it difficult to enter the space between the plates with scrapers in a direction other than in the direction of the axis of rotation of the plate pack. Plat acknowledges this disadvantage in his thesis by stating that plugging of plate packs by scale is often a problem, in particular in food industry, because of hygienic aspects. It would be desirable to have a device with comparable or even better separation efficiency which would be easy to clean.

Moreover it is disadvantageous in that a complex procedure is needed in this device to isolate a valuable heavy component.

Another type of separation device is presented in GB-A-1 476 670, which discloses a separator having an inner carrier with radial vanes attached thereto. The inner carrier and the vanes are rotatably mounted in an outer shell, which can be rotated independently of the vanes and the inner carrier. During separation the outer shell is rotated, the liquid entering the separator is rotated as well by the rotating action of the outer shell. This rotating action of the liquid entrains the inner carrier and the vanes. Thus, during normal operation the inner carrier is rotating at approximately the same speed as the outer shell. When the apparatus needs cleaning, the motion of the inner carrier is suddenly stopped by a brake. By this braking action, the vanes will wipe along the inner side of the outer shell, thus generating turbulence. This turbulence will loosen any clogging that had taken place on the inside of the outer shell. However material clogging to the vanes themselves is not affected by this operation, which is a drawback of this apparatus.

A further disadvantage of the apparatus of GB-A-1 476 670 is the complex sealing of the rotating outer and inner members. A further disadvantage is that the clogging on the vanes is difficult to remove. If the fixed mass is the valuable and recoverable mass, this apparatus is not suitable since it needs the liquid phase in order to remove the solid phase.

A further separation apparatus is presented in WO-A-99/54021. This document discloses a rotary type of separator with a set of disc shaped stacked flexible plates. In order to clean the plates, the separator is hold still. Due to the gravitational force, the separator plates are flexing downwards and thereby rub against each other. This rubbing action is disclosed to be sufficient in order to clean the plates.

A disadvantage of this separation apparatus is that it renders reclaiming the solid mass from the separator extremely difficult. A further disadvantage is that the flexible plates can stick to each other when the apparatus is out of service.

Another separating apparatus is presented in SU-A-1 369 810. This separation apparatus is provided with a first carrier to which curved flexible separation plates are attached. The separator plates are reaching through slits in a cup which can be rotated under a predetermined angle with respect to the first carrier. By rotating the cup, the slits move relatively to the carrier and thus slide along the surface of the plates. This exerts a cleaning action upon the plates which are wiped clean.

Again this apparatus is less suitable for reclaiming the solid mass from the separator. With this wiping and cleaning action again the liquid phase is needed for cleaning, thus re-diluting the valuable solids. A further disadvantage of the wiping cup is that the plates cannot be supplied with spacers or caulks, since these would obstruct the sliding of the plates within the slits of the wiping cup. Without the spacers, at high rotational speeds the flexible plates can deform, thus deteriorating a good separation performance.

Object of the present invention is thus to improve the separators known in the art as described above.

SUMMARY OF THE INVENTION

The inventors found that this object can be met by using plates that are able to spread out during solid discharge (including cleaning). This can be achieved by making the plates at least partly flexible and/or rotatably connected to a central carrier. If needed, each plate may be extended by a pivoting second plate, curved in such a way that it follows the radius of the outer carrier, thus preventing any sedimented solids to stick to the outer carrier.

Although the present application focuses on processing liquid feed streams, the present invention may equally well be applied for the separation of droplets or particles from a gas stream, e.g. filtering particulate matter from exhaust gas streams.

Thus, in a first aspect the invention is directed to a plate type rotational separator having a rotatable curved carrier and one or more curved plates, wherein the one or more curved plates are flexibly connected to the second carrier and are supported by the first carrier, wherein confined spaces are defined between adjacent curved plates and the first and second carrier.

In a second aspect, the invention may be extended by using flexible extensions to the curved plates, to cover the majority of the inner surface of the first carrier.

According to a specific embodiment, the rotational separator is a device for separating one or more components from a feed stream comprising a closed drum-shaped first carrier, which is rotatably driven on a rotation shaft, and a second carrier arranged coaxially in the first carrier, on which second carrier is mounted one or more curved plates, which plates extend in a pre-determined arc from said second carrier to said first carrier, with the feeding means provided at one end of the second carrier and the discharging means provided at the other end of the carrier, characterized in that said one or more plates are at least partly flexible and/or rotatably connected to the second carrier. The plates are preferably curved. In a specific embodiment of the invention the plates carry flexible extensions.

Further advantageous embodiments can be found in the description and in the appended claims.

The term "flexibly connected" as used in this application is meant to refer to any connection that is able to move, rotate, resiliently bend or stretch, wherein the motion, rotation bending or stretching is reversible so that the original arrangement of the connected parts can be reinstalled. Examples of a flexible connection are hinge like connections, bend like flexible parts, or other flexing or rotating connections.

The term "flexible material" as used in the present application is meant to refer to materials that are resilient in that they retain their original shape after deformation. These materials generally have a modulus of elasticity that is low, generally less than about 10 $kN/mm^2$, preferably less than 7 $kN/mm^2$, more preferably 0.1-5 $kN/mm^2$, and generally have an elastic limit that is generally higher than 10%, preferably higher than 5%, more preferably 0.01-2%. A low modulus of elasticity means that they are easily deformable, in that no extensive forces are needed to deform the material. A high elastic limit means that a deformation in one or more dimensions well above 10% is possible without exiting the elastic deformation region, also known as the Hook-region. Any deformation of an object within this region will have the effect that the object returns to the original shape after the deformation force is released. Examples of flexible materials are rubber, like silicon rubber, natural rubber, butadiene rubber, different elastoplastic materials and the like. Also other synthetic or natural resilient materials can be used. These materials normally have a modulus of elasticity below 1 $kN/mm^2$, and an elastic limit well above 100%.

The term "stiff material" as used in this application is meant to refer to materials that are rigid and difficult to deform, in particular difficult to bend. These materials generally have a modulus of elasticity that is low, generally more than about 50 $kN/mm^2$, preferably more than 75 $kN/mm^2$, more preferably less than 100-1 200 $kN/mm^2$.

BRIEF DESCRIPTION OF THE DRAWINGS

For a better understanding, examples of an interface device will now be further elucidated by the following Figures, wherein.

DETAILED DESCRIPTION OF EXEMPLARY EMBODIMENTS

In this description the same or corresponding parts will have identical or similar reference signs. The embodiments shown should not be understood as limiting the invention in any way or form.

Figure 1:
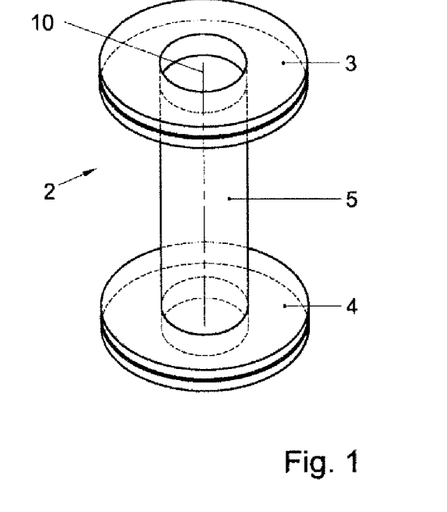
FIG. 1 is a schematic perspective view on the internal part of the separator according to a first embodiment, showing in particular second carrier 2.

FIG. 1 depicts in a perspective view the second carrier 2 of the device of the invention. The second carrier 2 comprises flanges 3 and 4 on both sides of a central body 5 of the carrier 2. The carrier 2 can be rotated around the imaginary axis 10.

Figure 2:
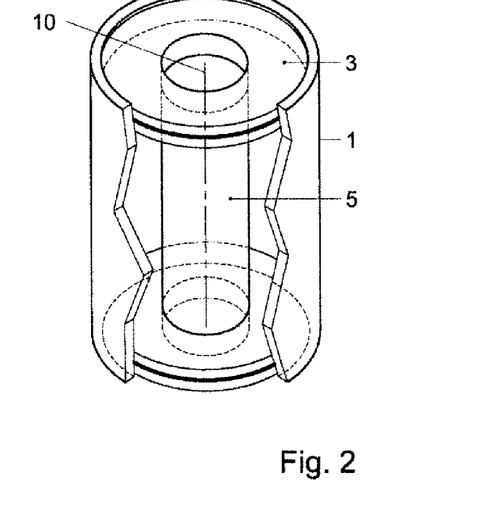
FIG. 2 is a schematic perspective cut open view on the separator according a first embodiment.

FIG. 2 depicts the separator wherein the second carrier 2 can be coaxially arranged into a first carrier 1. The first carrier 1 is in the form of a closed drum. Both carriers can rotate on rotation shaft (not shown) that is able to rotate around an imaginary axis 10.

Figure 3:
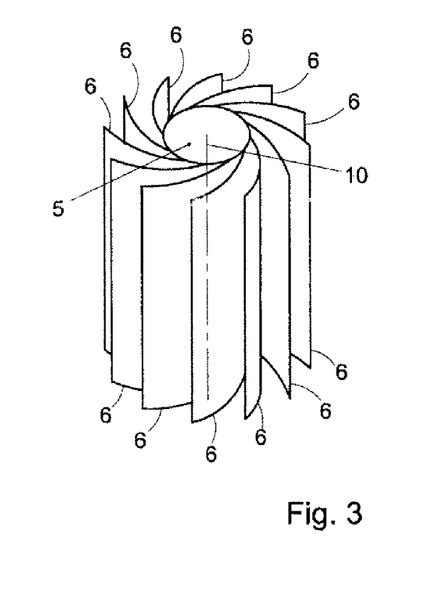
FIG. 3 is a schematic perspective view on an arrangement of the plates of the separator according to the first embodiment.
Figure 4:
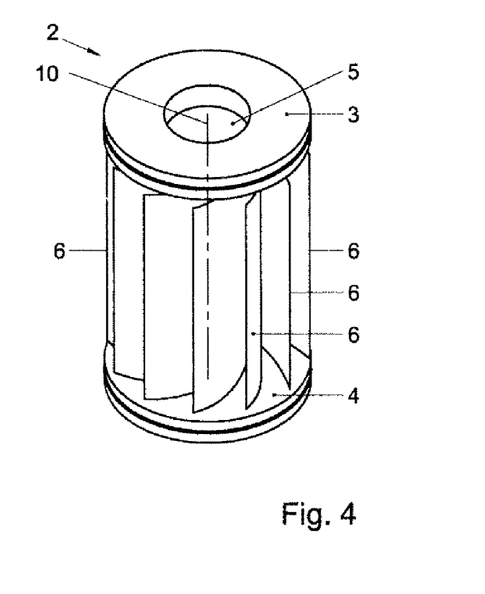
FIG. 4 is a schematic perspective view on an arrangement of the plates on the internal carrier according to the first embodiment.
Figure 5:
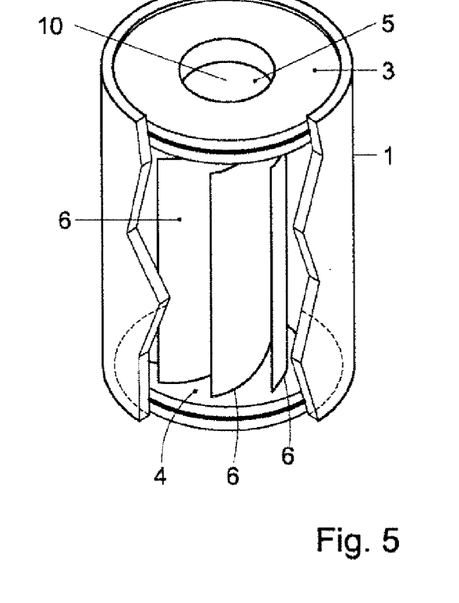
FIG. 5 is a schematic perspective cut-open view on the plate separator according to the first embodiment.

FIG. 3 depicts a front view of a plurality of curved plates 6 that can be used in combination with the second carrier 2. In the embodiment shown in FIG. 2, the plurality of curved plates 6 are constructed as a plate pack which can be easily mounted on the central body 5 of the second carrier 2 as shown in FIG. 4. The plurality of curved plates 6 are preferably homogeneously distributed on the second carrier 2, i.e. substantially equidistant. The plates 6 are mounted between the flanges 3 and 4. FIG. 5 shows the device of the invention comprising the first carrier 1 and the second carrier 2 on which the plurality of curved plates 6 is mounted.

Figure 6:
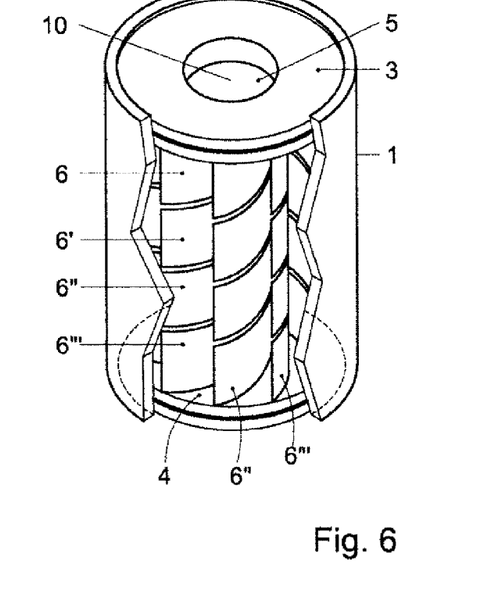
FIG. 6 is a schematic perspective cut-open view on the plate separator according to a second embodiment.
Figure 7:
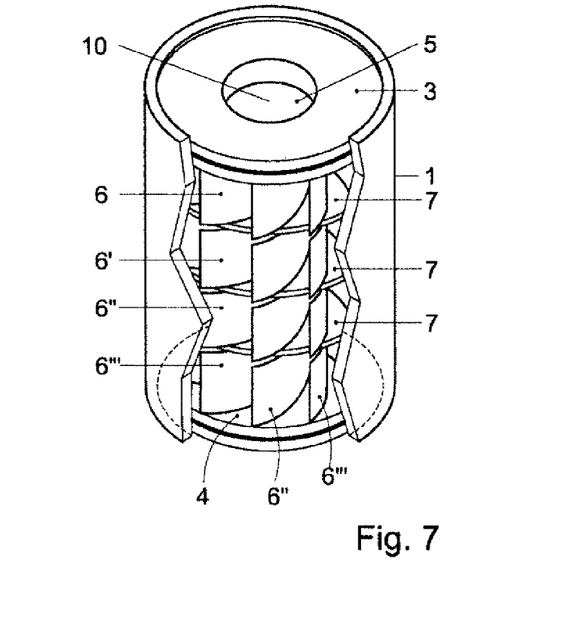
FIG. 7 is a schematic perspective cut-open view on the plate separator according to a third embodiment.

FIG. 6 shows an embodiment of the invention wherein the plurality of curved plates 6 comprises a number of different rows of plates 6,6',6'', and 6''' more specifically four different rows of plates. As shown in FIG. 7, in the space between different rows of plates 6,6',6'', 6''' one or more baffle plates 7 can be provided, for instance circular baffle plates 7. The different baffle plates 7 in the device may have different diameters.

Figure 8:
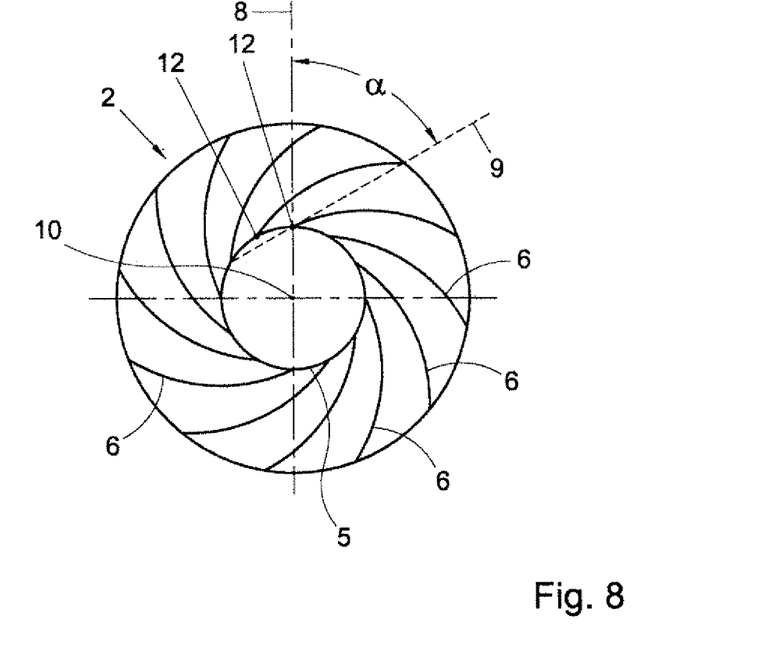
FIG. 8 is a schematic top view on the internal plates of the separator according to the first embodiment.

FIG. 8 is a top view of the device showing second carrier 2 with curved plates 6. This figure clearly shows the geometry of the plates with respect to the second carrier 2. The angle α between the radial 8 of the second carrier and the tangent 9 of the plates 6 at the joint 12 of the plate 6 with the central body 5 of second carrier 2 should be more than 0°. Thus, in accordance with the invention the curved plates 6 are not mounted radially on the second carrier, but under angle α.

Figure 9:
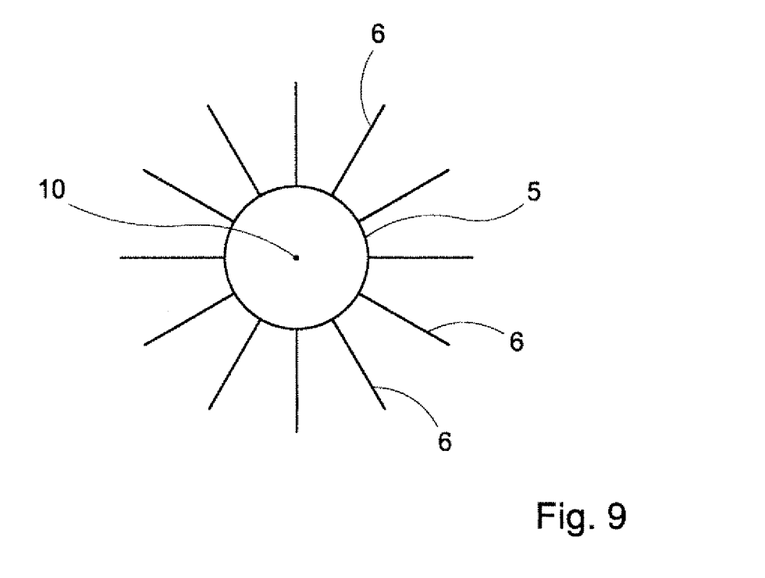
FIG. 9 is a schematic top view on the internal plates of the separator during cleaning according to the first embodiment.

FIG. 9 depicts a sectional view of the flexible plates 6 mounted on the central body 5 of the second carrier 2 during the cleaning of the plates 6. During cleaning the second carrier 2 with the plates 6 is axially taken out of the first carrier 1. The carrier 2 is spun so as to remove any contamination from the plates 6. Due to the centrifugal forces the flexible plates 6 tend to straighten radially outwards or almost radially outwards, as is depicted in FIG. 9. Due to the flexible deformation of the plates 6, the contaminants are easily spun off.

Figure 10:
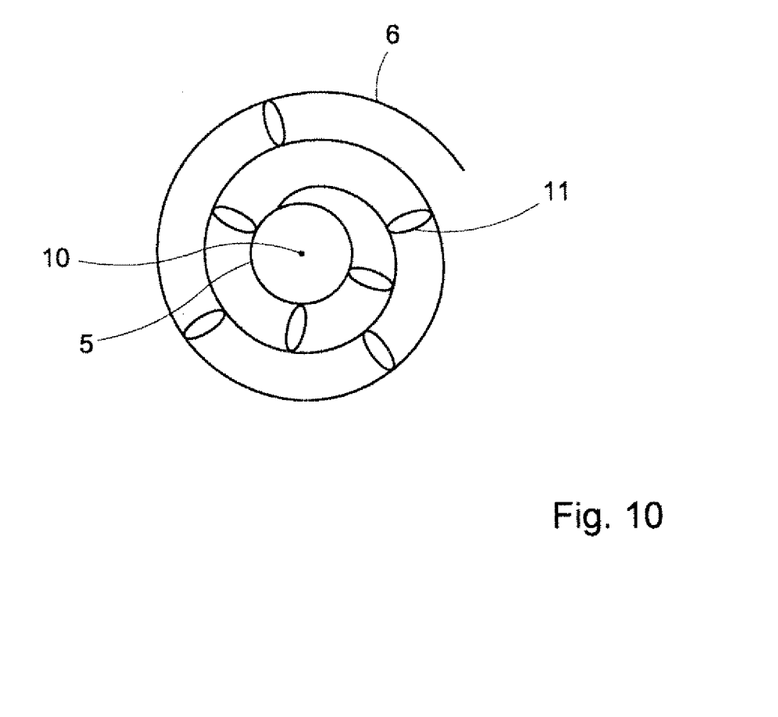
FIG. 10 is a schematic top view of an internal plate according to the third embodiment.

FIG. 10 depicts an alternative embodiment of the separation device with only one plate 6. The plate 6 is wound around the central body 5 of the second carrier 2 and kept at a distance by spacers 11, which are typically present on the surface of each plate. During a cleaning operation of this plate 6 it can be unwound by centrifugal forces or, by any other means.

Figure 11:
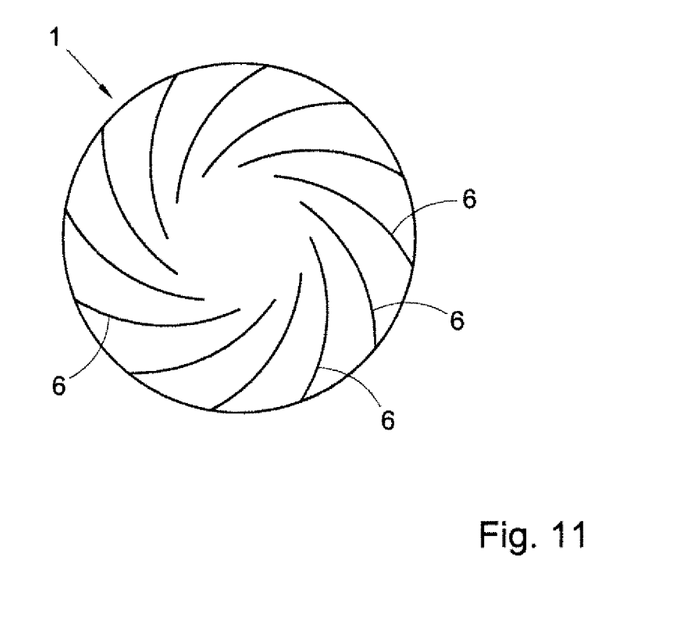
FIG. 11 is a schematic top view of the internal plates according to a fourth embodiment.

FIG. 11 depicts another alternative embodiment of the separator in which the plates 6 are connected to the first carrier 1. During cleaning of a plate stack as depicted in FIG. 11, the contaminants on the plates are removed by the plates being pressed closely together due to the centrifugal forces, thus squeezing out any contaminants.

Figure 12:
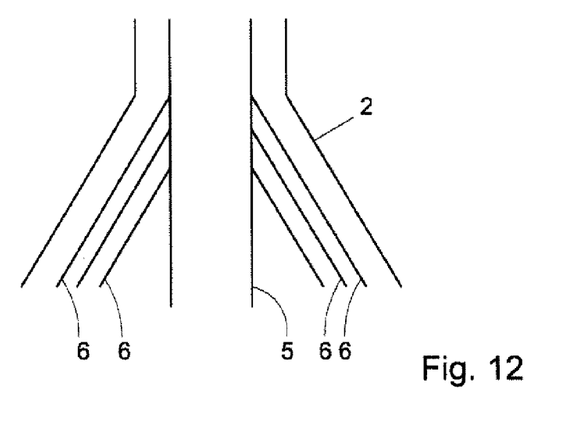
FIG. 12 is a schematic sectional view of the separator according to a fifth embodiment.
Figure 13:
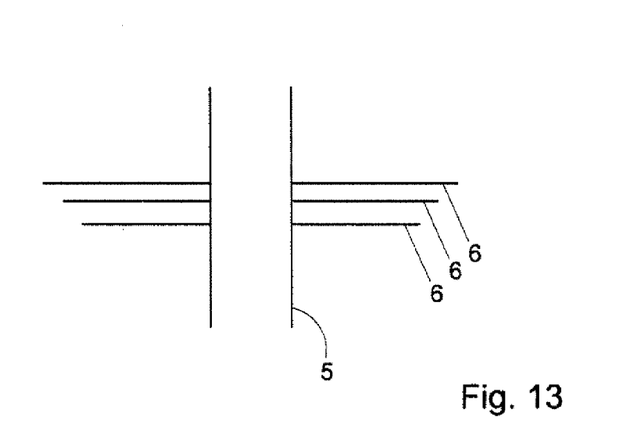
FIG. 13 is a schematic sectional view of the plate arrangement during cleaning according to the fifth embodiment.

FIG. 12 depicts still a further embodiment of the separator. In this embodiment the plates 6 are arranged around a central body 5 of the second carrier 2 like the plates of a stacked disc bowl type centrifuge. In this case again the plates 6 are made of a flexible material. In this case, during cleaning as is depicted in FIG. 13, due to the centrifugal forces, the plates 6 tend to form flat discs. Again the contaminants are easily removed, since the plates 6 are in an approximate flat disc shape and hindrance of the other plates is thus avoided.

Figure 14:
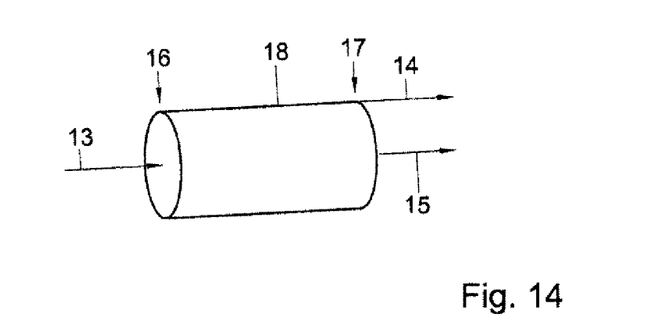
FIG. 14 is a schematic view of the separation device during operation.

FIG. 14 depicts a schematic view on the separation device used during operation. In operation, the feed stream 13 which is fed into the rotating device via the feeding means on one end 16 of the device flows parallel, or substantially parallel, to the axis of rotation 10 to discharging means 14, 15 positioned on the other end 17 of the device. Preferably, the device has at least two discharging means 14, 15, one discharging means 14 can be placed near wall 18 of the first carrier and is thus suitable for discharging a heavy fraction, another discharging means 15 can be placed near the central body 5 of the second carrier 2 and is thus suitable for discharging a light fraction.

The feed stream 13 (which can be a liquid, a gas, a suspension, or a dispersion) is subjected to centrifugal forces in the space between the flexible plates 6. Under the influence of the centrifugal forces one or more components of the feed either move towards the central body 5 of the second carrier 2 or away from the rotation shaft towards the outside wall 18 of the first carrier 1 depending on their specific weight relative to the specific weight of surrounding components. The feed 13 is thus separated based on the specific weight of the different components. In particular, the device of the invention is suitable for separating a mixture of two different liquids, for the removal of solids from a dispersion or suspension, and for the removal of solids from a mixture of two different liquids where optionally at the same time the two different liquids are separated.

Figure 15:
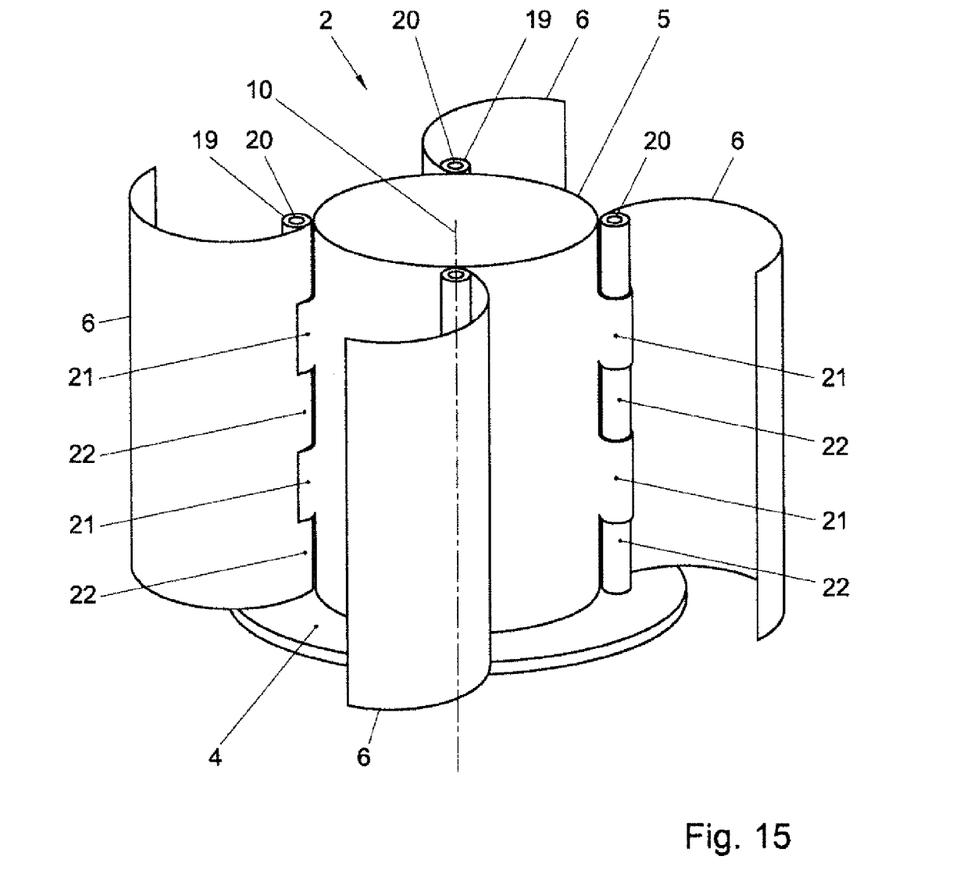
FIG. 15 is a schematic detailed view of the separator according to a sixth embodiment.

FIG. 15 discloses the separator according to a fifth embodiment, wherein the plates 6 are made of a stiff material, for instance stainless steel, wherein the plates 6 are curved and connected to body 5 of the carrier 2 with hinges 19. The hinges 19 have engaging parts 21 and 22, the engaging parts 21 are connected to the body 5 of the carrier 2, the engaging parts 21 are connected to the plates 6. The engaging parts 21 and 22 of the hinge 19 are held together by pin 20. Around pin 20 the engaging parts 21 and 22 can rotate relative to each other. The plates 6 are during normal separation operation in an arrangement close to each other fitting within the carrier 1. During the cleaning operation, when the outer carrier 1 is removed and the carrier 2 with the plates 6 are spun, the plates will extend outwardly by the centrifugal forces, and thus the contamination on the plates can easily be removed.

Figure 16:
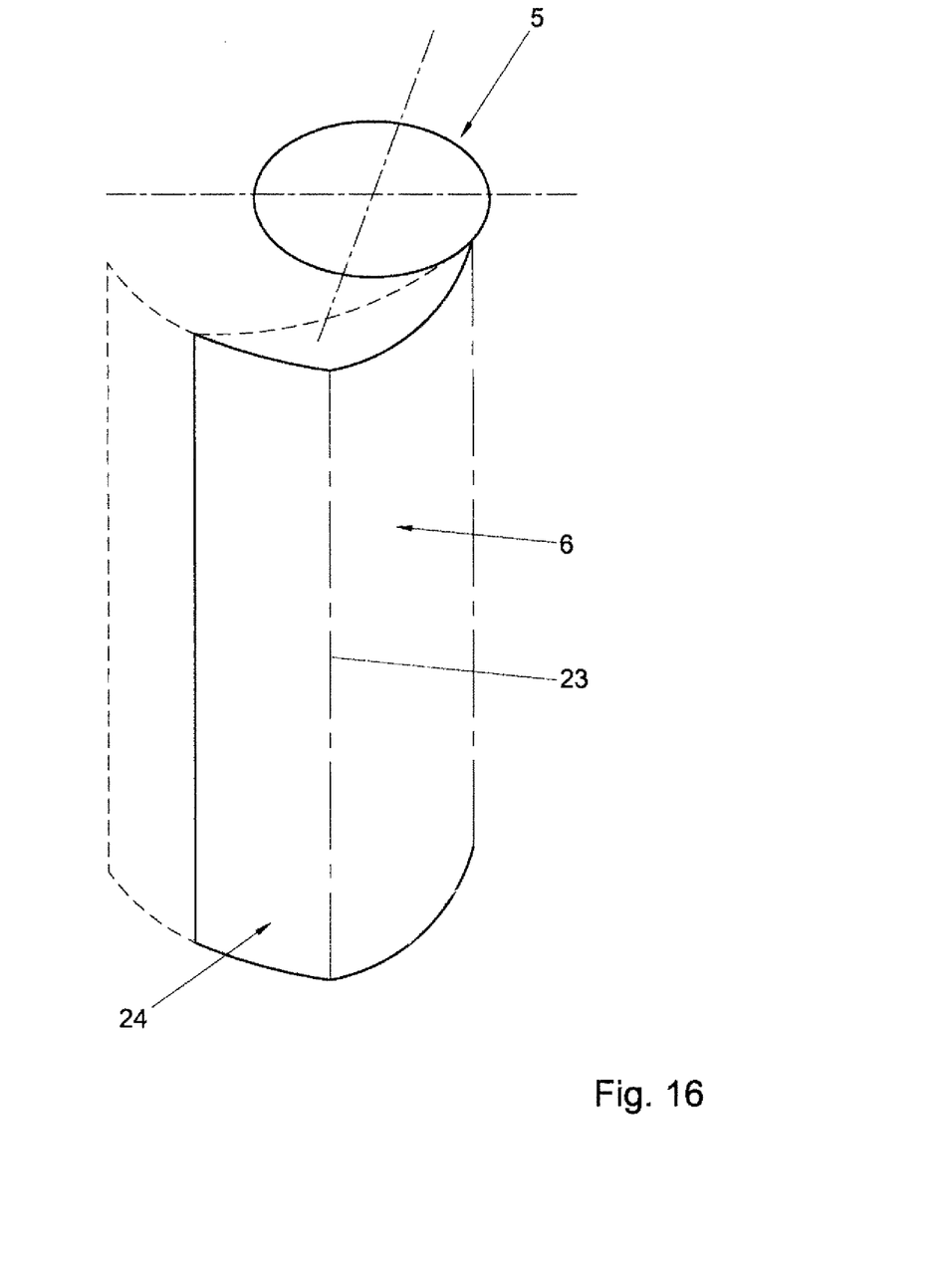
FIG. 16 is a schematic detailed view of the separator according to a further embodiment.

FIG. 16 depicts central body 5, carrying curved plates 6 (only one curved plate 6 is shown here) where curved plates 6 are connected via flexible joint 23 to a secondary curved flexible plate (or flap) 24. In this embodiment a plurality of flexible plates 24 collectively cover at least part and preferably entirely the inner surface of carrier 1, preferably stretching out for the entire length (or height, corresponding to the dimension in vertical direction in FIG. 16) of carrier 1. The advantage of this configuration is that build-up of deposited material to the surface of the inner side of first carrier 1 is avoided because the deposited material builds up against flexible plate 24 instead of against the inner side of first carrier 1. Thus the surface of first carrier 1 is effectively shielded from built-up of deposits by flexible plates 24. As a result, removing first carrier 1 by sliding it becomes much easier, since the sliding forces are considerably lower in the absence of deposited material on first carrier 1. In one embodiment of this configuration the amount of curved plates and the dimensions of flexible plates 24 are chosen such that the total width of the curved flexible plates 24 together covers the entire inner circumference of carrier 1. Preferably for this embodiment the length (or height) of flexible plates 14 are such that also the entire length of carrier 1 is covered, so that essentially the entire inside surface area of carrier 1 is covered. In other words, in that embodiment, the length of each flexible plate 24 is the inside diameter of carrier 1 times Π divided by the number of flexible plates 24 (or the number of curved plates 6).

When the one or more components are separated from the feed and contained in the device it is possible to remove the one or more components from the device. To this end the first carrier 1 can be axially removed from the second carrier 2 of the separation device. The first carrier 1 then becomes accessible for cleaning or isolation of the component clogged on the wall of the first carrier 1.

To prevent clogging of material to the wall of the first carrier 1, the wall is covered by secondary curved plates 24. Secondary curved flexible plates 24 may have the similar or almost similar curving radius as the radius of first carrier 1.

An important advantage of the present invention is that components that are contained on the surface of the flexible plates 6 and on the surface of secondary flexible plates 24, when present, can then be easily removed or isolated by fast rotation of the second carrier 2 with the plurality of plates 6 and optional secondary plates 24 in the absence of the first carrier 1. This causes the flexible curved plates 6 and optional secondary plates 24 to deform such that they become at least more radial with respect to the axis of rotation 10. Deformation of the plates 6 and optional secondary plates 24 has the effect that solid components, which are strongly adhered to the plates 6 and optional secondary plates 24, are released from the plates 6 and optional secondary plates 24. At the same time the centrifugal forces fling the components from the flexible plates 6 and optional secondary plates 24. The released components can for instance be collected in a separate receptacle. Because deformation of the plates significantly contributes to the release of the component from the plates 6 and optional secondary plates 24, the second carrier 2 with the plates 6 and optional secondary plates 24 can be rotated at much lower speed than is used in the art.

In addition, the volume between enclosed the first carrier 1, two plates 6 and optional secondary plates 24 and the second carrier 2, in which part of the component is collected during the separation process, enlarges itself during the release process. In this way wedging of the collected component during the release process is prevented.

Preferably, the plates 6 are fabricated from an elastic material so that the plates 6 return to their initial form after deformation. After release and removal of the components from the plates 6, they take there initial curved form. When secondary plates 24 are present, they are preferably from the same material as plates 6 for the same considerations.

This is especially favourable for remounting the second carrier 2 within the first carrier 1 of the separation device. It is advantageous that the plates 6 stretch under the centrifugal force during cleaning. This stretching further enables the removal of the contaminants on the surface of the plates 6. The same applies to secondary plates 24 when present.

In a preferred embodiment the plates 6 are mounted on the second carrier 2 by means of flexible joints 12. Such a flexible joint 12 can contribute to the plates 6 becoming radial with respect to the rotational shaft and the axis of rotation 10 during release of the component from the plates 6. The flexible joint can be for instance a hinge connection.

In a preferred embodiment the secondary plates 24 are mounted on the plates 6 by means of flexible joints 23. Such a flexible joint 23 can contribute to the plates 24 becoming radial with respect to the rotational shaft and the axis of rotation 10 during release of the component from the plates 24. The flexible joint can be for instance a hinge connection.

After the cleaning is performed the plates must be brought back in their original positions in order to be brought back in the carrier 1.

This can for instance be performed by an arm that guides the plates back in their original position while the carrier to which the plates are mounted is slowly turning. The arm can be mechanically, automatically or manually be operated. Other means for reinstalling the plate packs in their original position can be used.

The flexible joints 12 that are used to mount the plates 6 on the central body 5 of the second carrier 2 can be made of resilient and/or flexible material as well. It can be the same and/or different material as the material the plates 6 are made of. The joints can be provided with pivots. It can also be alternative joints like for instance hinges, constrictions, or the like. The joints 12 might alternatively be provided with springs in order to get back in the original shape after the cleaning operation is performed, these springs again can be made out flexible material which is the same or different from the material the plates are made of. The springs can alternatively be made of metal in any suitable form.

The flexible joints 23 that are used to mount the plates 24 on the on the plates 6 can be made of resilient and/or flexible material as well. It can be the same or a different material as the material the plates 24 are made of. The joints can be provided with pivots. Also alternative joints, such as for instance hinges, constrictions, or the like can be used. The joints 23 may alternatively be provided with springs in order to revert to the original shape after the cleaning operation is performed. Such springs again can be made out flexible material which is the same or different from the material the plates are made of. The springs can alternatively be made of metal in any suitable form, e.g. stainless steel.

In a special embodiment of the invention, the plurality of plates 6 comprises at least two different rows of plates. These rows can be mounted on top of each other on the second carrier, preferably by a flexible joint.

The separate rows of plates 6 can be of similar or of different size, the number of plates may be in every row the same or a different number. The geometry of the plates 6 can be similar for all plates, it can also be advantageous to have in different layers different geometries of the plates 6 in order to reach an optimal performance of the separator device. In case different rows of plates 6 are used it is possible to provide a baffle plate between two different rows of plates 6. The baffle plate is preferably circular and can be perforated or non-perforated. The diameter of the baffle plate may be between the diameter of central body (5) and inner diameter of first carrier. Preferably the diameter of the baffle plate is 95-99%, more preferably 98-99% of the diameter of the first carrier. The plates of one row can be fit tightly to the plates of a different row of plates 6 and/or to a baffle plate or can be spaced apart form a different row of plates 6 and/or the baffle plates.

In a particular embodiment, at least part of the plurality of plates 6, and optionally plates 24, and preferably all of them, are provided with a coating. This coating can also be applied to the plates of one row of plates. Different rows can be coated differently depending on the characteristics of the composition of the mixture to be separated. The one or more plates may be coated with a coating that is either chemically active or non active. It is preferred that the coating is chemically active. Particularly preferred is a coating that is able to enhance or speed up the separation process. The coating can for instance be a hydrophobic or hydrophilic coating, but it is also possible to provide the plates with certain functional chemical groups in order to introduce chemical specificity.

Another possibility is to provide the plates with a silicone or similar coating. Such coatings can assist in the release of solid components from the plates. Suitable coatings can for example be Teflon®-like coatings, silicon coatings, or other coatings. The surface properties can also be adapted by choosing the material of the plates themselves. In a preferred embodiment, the applied coating is an abrasion-resistant coating. The amount of plates that are used in the device depends on the envisaged use and on the required distance between the plates.

The shortest distance between two different plates 6 is preferably 0.1-500 mm, preferably 0.1-100 mm, more preferably 0.1-50 mm, and most preferably 0.1-5 mm. In a preferred embodiment, the plates are substantially equidistantly distributed on said second carrier. The term "substantially equidistantly distributed" in this context is meant to indicate that the connecting points between body 5 and each individual plate are having substantially the same distance, for instance within a margin of 25%, preferably within a margin of 10%, distributed around the circumference of body 5.

The angle $\alpha$ between the radial 8 of the second carrier and the tangent 9 of the plates 6 at the joint 12 of the plate 6 with the second carrier 2 (indicated in FIG. 8) is larger than 0°, preferably larger than 10°, and more preferably larger than 20°. Practically, the angle can not be larger than 90°. Preferably, the angle $\alpha$ is 5-60°, more preferably 10-45°.

In the separator of the current invention the plates 6 can be made of a material that has a density that is similar to or higher than the fluids that are to be separated. This in order to prevent that during the separation action the deformation of the plates 6 due to the centrifugal forces is not too high. In case the plates are constructed of a stiff material, having a density different from the fluids to be separated, the mechanical strength of the plates should suffice to at least partly prevent deformation of the plates during the separation process.

A deformation can have effects on the efficiency of the separation process. The plates in the current invention can be provided with caulks or spacers in order to guarantee a specific distance between adjacent plates. These spacers might be of the same material of construction as the plates themselves or of a different material. The caulks or spacers may be shaped within the very same mould the plates themselves are moulded in. The caulks can be formed in various shapes, for instance as protruding lobes, embossed recesses, fingerlike protrusions, cam shaped spacer and the like. They can alternatively be mounted on the plates later on. The caulks can be arranged such that different spacers support other spacers so that radially a number of arrays of spacers is obtained that can maximally distribute forces during operation.

The plates 6 may be of a uniform thickness over their full length and width or may vary in thickness. Any other geometry of the plates may also be applied in order to improve maximum efficiency. The plates 6 can thus for instance be rectangular, square, triangular, or any other shape. The plates can also be provided with little holes, grooves or any other surface structure that is able to increase the performance of the separator device.

The plates 6 can be mounted to the outer carrier 1 and/or to the inner carrier 2. Numerous further adaptations and modifications are possible. For instance the plates can be partly strengthened with ribs and/or strips of different material. The flexible plates can for instance also be used only one time, after which the plates are recycled or thrown away.

Figure 17:
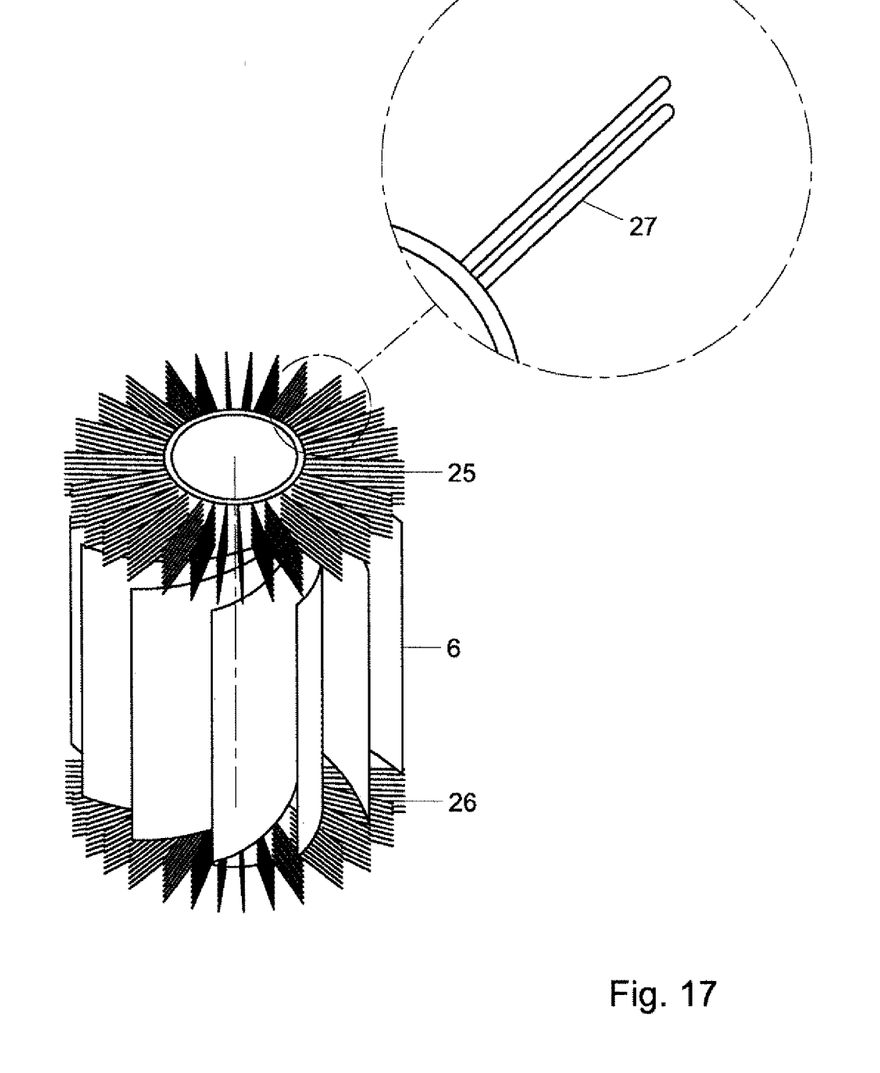
FIG. 17 is a schematic detailed view of the separator according to yet a further embodiment.

FIG. 17 shows a further advantageous embodiment wherein the separator is further equipped with a drum shaped rotating brush element 25 at the entrance side of the separator. This element can be coaxially rotated with the carriers 1 and 2. This element can be provided with flexible strands 27 that reach from the inner carrier out to the outer carrier and can help wiping the inside of the outer carrier when the outer carrier is removed, typically by being pulled in upward direction, before the solid material is to be reclaimed. The brush element can also accelerate the incoming liquid. Similarly a brush element 26 at the other side of the separator might be used to reclaim part of energy from the rotational movement of the liquid. Any deposits that may have accumulated between flange 3 and first carrier 1, that could cause seizing up of flange 3 and carrier 1 are whiped clean of such deposits, thus preventing seizing up of carrier 1 and flange 3. During the discharge cycle brush elements are also cleaned by centripetal forces. The ratio of the heights of brush elements 25 and 26 vis-à-vis the height of plates 6 can be chosen such that optimal cleaning action is obtained.

Combinations of all the different embodiments set out hereinabove are also possible and within the scope of the present invention.

What is claimed is:

1. A rotational centrifugal separator for separating one or more components of a feed stream, comprising:
   a rotatable first outer carrier and a rotatable second inner carrier, wherein the second inner carrier is coaxially arranged in the first outer carrier around an axis wherein both carriers are rotatable around the axis;
   one or more curved plates, wherein the one or more curved plates are supported by the first outer carrier, and are flexibly connected to the second inner carrier; and
   feeding means at one end of the separator for supplying a feed stream to be separated and discharging means at an opposite end of the separator for discharging separated streams,
   wherein between adjacent curved plates and the first outer and second inner carrier confined spaces are defined for separation of the feed stream under influence of centrifugal forces, wherein the first outer carrier is axially removable from the second inner carrier for removing components collected on the plates.

2. The separator according to claim 1 wherein at least part of the plates are made of a flexible material.

3. The separator according to claim 2, wherein said flexible plates are elastic and return to their initial form after deformation.

4. The separator according to claim 1 wherein at least part of the plates are rotatably connected to the second inner carrier.

5. The separator according to claim 4 wherein at least part of the plates are made of a stiff material and wherein these plates are able to pivot relative to the second carrier.

6. The separator according to claim 1 wherein the first outer carrier is a closed drum-shaped first carrier, which is rotatably driven on a rotation shaft.

7. The separator according to claim 6, wherein said one or more plates are mounted on said second inner carrier, which plates at least partly extend from said second inner carrier to said first outer carrier.

8. The separator according to claim 7, wherein an angle $\alpha$ between the radial of the second inner carrier and the tangent of the plates at the joint of the plate with the second inner carrier is more than 0°.

9. The separator according to claim 7, wherein said one or more plates are mounted on said second inner carrier by means of a flexible joint.

10. The separator according to claim 7, wherein an angle α between the radial of the second inner carrier and the tangent of the plates at the joint of the plate with the second carrier is 5-85°.

11. The separator according to claim 10, wherein the angle α between the radial of the second inner carrier and the tangent of the plates at the joint of the plate with the second carrier is 10-45°.

12. The separator according to claim 1 wherein said one or more plates are curved or shaped in a pre-determined arc.

13. The separator according to claim 12, wherein said plates comprise at least two different rows of plates and wherein at least one baffle plate is provided in a space between two rows of plates.

14. The separator according to claim 13, wherein said at least one baffle plate is a circular baffle plate.

15. The separator according to claim 1, further comprising a rotatable drum shaped brush arranged proximate the feeding means.

16. The separator according to claim 15, further comprising a second rotatable drum shaped brush arranged proximate an opposite side of the separator with respect to a feeding means entrance.

17. A method for separating one or more components of a feed stream, the method comprising the steps of:
    providing a separator according to claim 1,
    feeding a feed stream to the separator,
    collecting one or more components by rotating the first outer and second inner carrier and the curved plates there between,
    stopping the feed,
    removing the remaining feed from the separator,
    opening the separator by axially removing the first outer carrier,
    spreading the plates by rotating the second inner carrier and the thereto attached separation plates, and
    collecting the components that are flung out the spread plates.

18. A rotational centrifugal separator for separating one or more components of a feed stream, comprising:
    a rotatable first outer carrier and a rotatable second inner carrier, the second inner carrier being coaxially arranged in the first outer carrier around an axis, both carriers being rotatable around the axis, the first outer carrier being axially removable from the second inner carrier for removing components collected on the plates;
    one or more curved plates flexibly connected to the second inner carrier, the one or more curved plates being supported by the first outer carrier, adjacent curved plates and the first outer and second inner carrier defining confined spaces therebetween for separation of the feed stream under influence of centrifugal forces;
    a feeding arrangement at one end of the separator, the feeding arrangement being configured to supply a feed stream to be separated; and
    a discharging arrangement at an opposite end of the separator, the discharging arrangement being configured to discharge separated streams.

* * * * *

UNITED STATES PATENT AND TRADEMARK OFFICE
CERTIFICATE OF CORRECTION

PATENT NO.        : 8,511,475 B2                                     Page 1 of 1
APPLICATION NO.   : 12/667324
DATED             : August 20, 2013
INVENTOR(S)       : Hendrik Arie Boele It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 715 days.

Signed and Sealed this

Fifteenth Day of September, 2015

Michelle K. Lee
*Director of the United States Patent and Trademark Office*